United States Patent [19]
Yoshioka

[11] 3,776,125
[45] Dec. 4, 1973

[54] DEVICE FOR RECOVERING COOKING OIL SEPARATELY FROM THE HEATING FURNACE OF A DEEP FRYER

[76] Inventor: Yoshitomo Yoshioka, 23-23, 2-chome, Naka-Ikegami, Ohta-ku, Tokyo, Japan

[22] Filed: Dec. 28, 1971

[21] Appl. No.: 212,931

[30] Foreign Application Priority Data
Feb. 26, 1971  Japan.................................. 46/9588

[52] U.S. Cl. .................................... 99/403, 126/385
[51] Int. Cl. ............................................ A47j 37/12
[58] Field of Search....................... 99/403, 404, 405, 99/406, 407, 408, 444, 446, 355; 126/383, 384, 385, 386

[56] References Cited
UNITED STATES PATENTS

| | | | |
|---|---|---|---|
| 3,433,150 | 3/1969 | Fries | 99/403 |
| 2,861,514 | 11/1958 | Sech, Jr. | 99/406 |
| 2,182,735 | 12/1939 | O'Dowd | 99/403 |

Primary Examiner—Leon G. Machlin
Attorney—John J. McGlew et al.

[57] ABSTRACT

A device for deep frying particularly a device for frying potato chips in oil comprises a trough for the frying oil having a ledge on at least one side thereof. A furnace casing encloses the furnace heating space below the trough and it includes a vertical wall which abuts against the edge of the ledge and which is sealed to the ledge such as by welding. A cover encloses the top of the trough and overlaps the exterior surface of the vertical wall. The cover is secured to the vertical wall such as by securing bolts in a manner defining a drip space for the cooking oil which collects on the cover and runs down along the side thereof through the drip space. A drain device is provided on the exterior of the vertical wall in a position to receive the drip oil which may be recycled to the cooking trough.

7 Claims, 6 Drawing Figures

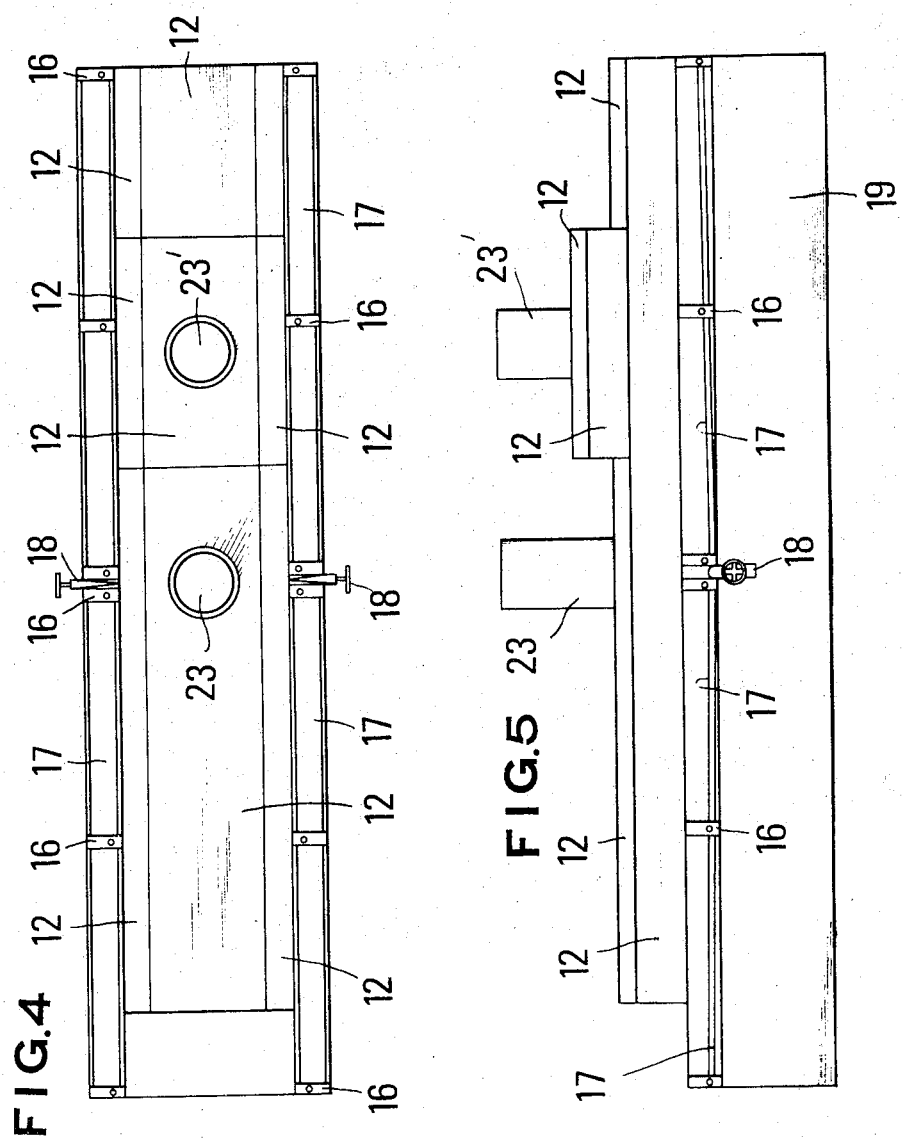

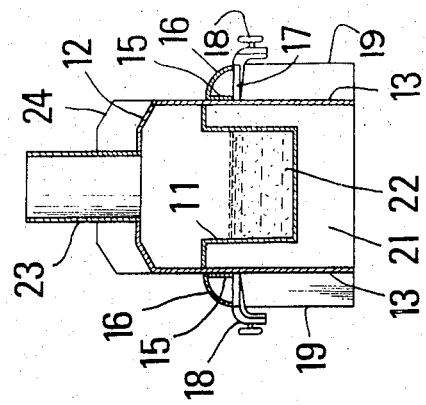
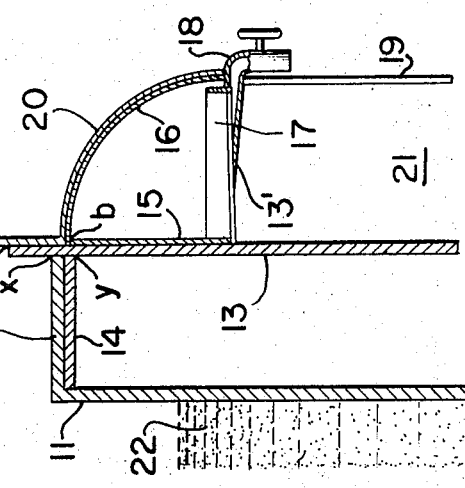
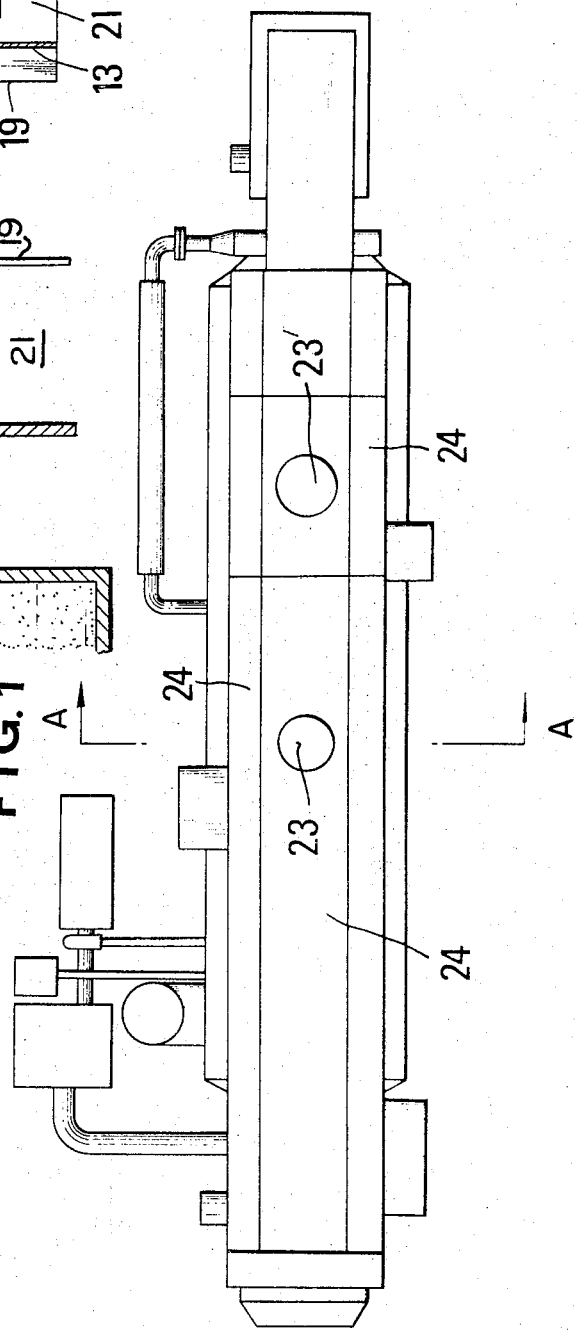

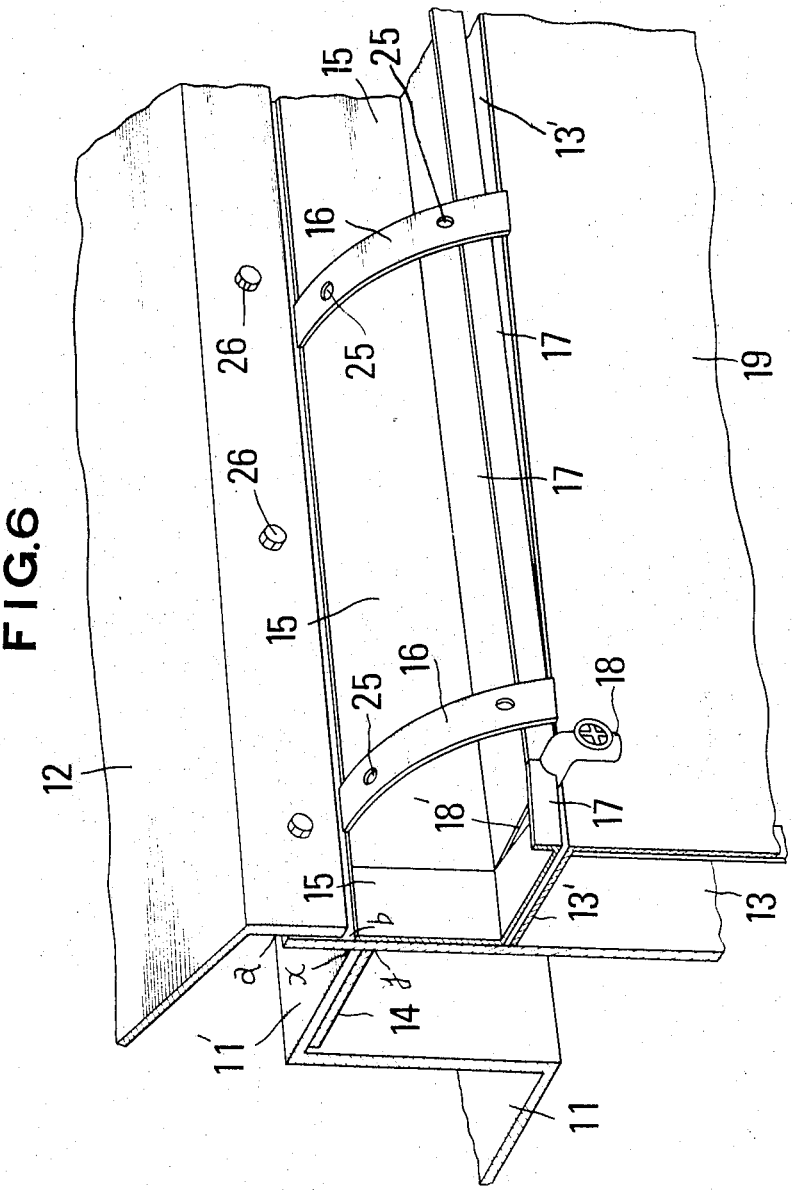

DEVICE FOR RECOVERING COOKING OIL SEPARATELY FROM THE HEATING FURNACE OF A DEEP FRYER

BACKGROUND OF THE INVENTION

1. Field of the Invention

This invention relates in general to cooking devices and in particular to a deep frying device which includes a cooking oil trough which is heated by a furnace applying heat from below and to an improved means for collecting the evaporated oil in a manner such that it does not contaminate the furnace.

2. Description of the Prior Art

At the present time devices particularly for cooking potato chips are known which include a trough for the cooking oil which is separated from a furnace which is located below the trough and which is provided for continuously heating the oil. In the known constructions the cooking oil which boils out or evaporates collects on a cover and in most instances it tends to drip backwardly into the combustion chamber where it is apt to cause uncontrolled burning and possible disruption and destruction of the furnace elements.

SUMMARY OF THE INVENTION

An object of the present invention is to recover the extra leak oil which was scattered from an oil pan during the run of a potato chip autofryer and which is deposited onto an inner wall surface of a fryer cover (an oil pan cover) by the steam and was not recovered into the oil pan as droplets through a flanged surface of the oil pan, and to exhaust the recovered oil to the exterior through a drain pipe whereby a risk for combustion of frying oil outside a furnace is completely eliminated and a complete recovery of the leak oil is accomplished.

The present invention also has its object to overcome the difficulty in controlling a furnace temperature resulting from the combustion within the furnace due to the fact that oil droplets deposited on the inner surface of a cover for the oil pan penetrate into a clearance at the junction of bottom inner wall of the cover and an outer edge of a flange member and to eliminate a danger of catch fire to the areas other than burner area, both of which have been big problems for years in a conventional fryer set. These problems are overcome by fitting an upper portion of a vertical carrier plate into a clearance between an edge of flange member of the oil pan and a lower edge of the oil pan cover, welding a junction of outer surface of the carrier plate and outer surface of a vertical member of an L-shaped bracket mounted on the exterior of the carrier plate, joining the inner surface of the vertical carrier plate and the flange member and an outer edge of a horizontal carrier plate welded to the flanged member, and mounting a pair of receiving plates each having a drain formed at the center thereof on a horizontal member of the L-shaped bracket with the plates inclining gently towards the center.

Accordingly it is an object of the invention to provide a device for simply and easily collecting the cooking oil which condenses on a cover or chimney for a deep fryer and without contaminating the heating equipment.

A further object of the invention is to provide a deep fryer which is simple in design rugged in construction and economical to manufacture.

BRIEF DESCRIPTION OF THE DRAWINGS

The accompanying drawings show a preferred embodiment of the present invention in which;

FIG. 1 is a plan view of a complete fryer section in a potato chip auto-fryer system;

FIG. 2 is a cross sectional view taken on the line A—A of FIG. 1;

FIG. 3 is a partial, enlarged view of FIG. 2;

FIG. 4 is a plan view of a complete fryer section when an outer cover is removed;

FIG. 5 is a side view of a complete fryer section when an outer cover is removed; and FIG. 6 is an enlarged perspective view, partly in section, of a major portion of an oil catcher.

In the drawings, the reference numeral 11 designates an oil pan, 12 is an oil pan cover, 13 is a vertical carrier plate separating a combustion section and an oil catcher section of a furnace, 13' is a horizontal member of an L-shaped bracket, 14 is a horizontal carrier plate of a lower edge of a flange member, 15 is a vertical member of the L-shaped bracket, 16 is a carrier member of a bracket cover, 17 is a receiving plate for leak oil, 18 is a drain pipe, 18' is a drain channel, 19 is a vertical member for carrying the bracket, 20 is a cover for the bracket, 21 is a combustion chamber, 22 is frying oil, 23, 23' are chimney pipes, 24 is an outer cover for a fryer section, 25 is a tapped hole threadably engaging with the cover for the bracket, and 26 is a set screw for connecting the cover for the oil pan with the carrier plate 13.

DETAILED DESCRIPTION OF THE INVENTION

In a conventional potato chip auto-fryer, since the welds between the flange edges of the oil pan and the lower end of the oil pan cover, between the vertical carrier plates and the flange edges, and between the vertical carrier plates and the vertical members of the L-shaped brackets are roughly finished as a result of the disadvantages common to so-called plate work, it is not always true to say that certain parts of the oil droplets evaporated with water from the oil pan, or scattered from the oil pan and deposited to an inner wall surface of the oil pan cover, drop vertically into the oil pan from the inner wall at the top of the oil pan cover, and the remainder flows along the inner wall surface of the oil pan cover and into the oil pan through the upper surfaces of the flange members of the oil pan, and the flow is divided into clearances at the junction of the outer sides of the vertical carrier plates and the outer surfaces of the vertical members of the L-shaped brackets and clearances at the junctions of the upper end surfaces of the vertical members of the L-shaped brackets and the lower end edge of the oil pan cover. Rather, parts of the oil droplets tend to penetrate into a clearance between the lower end edge of the oil pan cover and the wall of the combustion chamber to flow into a furnace for combustion therein, so that the function of temperature control in the furnace is damaged and the areas other than burner section tend to burn, which is very dangerous.

It is an object of the present invention to eliminate the risk of combustion of frying oil outside the furnace and allow complete recovery of the leak oil other than the oil returning from the inner wall surface of the oil pan cover through the flange surface of the oil pan into the oil pan, by collecting the leak oil and exhausting it exteriorly through a drain.

The upper member of the vertical carrier plate 13 is fitted into the clearance between the outer end edges of the longitudinal flanges 11' of the oil pan 11 and the inner walls at the bottom ends of the cover 12 for the oil pan 11. The clearance at the junction (line X-Y) of the outer end edges of the flanges, 11' having the horizontal carrier plates 14, 14 welded at the bottom surfaces thereof and the vertical carrier plate 13 and the clearance at the junction of the outer surface of the vertical member 15 of the L-shaped bracket of the apron section and the vertical carrier plate 13, respectively, are completely welded. The junction of the upper outer end edges of the carrier members 16, 16 of the bracket cover 20 and the lower end edges of the oil pan cover 12, 12 is also welded, but the junction (line a-b) of the inner surfaces of the bottom portions of the oil pan cover 12 and the outer surface at the top of the vertical carrier plate 13 is not welded but the clearance is maintained. Thus, the oil droplets evaporated and deposited onto the inner side wall of the oil pan cover 12 are prevented from penetrating and leaking into the furnace 21 through the line X-Y (see FIG. 3), and the leak oil, other than the oil dropping onto the flange surfaces 11', 11' and returning into the oil pan, necessarily flows from the line a-b through the vertical members 15, 15 of the L-shaped bracket into the receiving plates 17, 17 and then is directed to the drain 18. Accordingly, the leak oil can be rapidly recovered with ease and the combustion of frying oil in the furnace 21 is prevented, which serves to maintain the normal function of temperature regulation in the furnace and prevent the risk of catch fire to the exhausted oil or the combustion thereof outside the furnace.

What is claimed is

1. A device for deep frying particularly potato chips in oil, comprising a trough for the cooking oil having a ledge on at least one side, a furnace casing enclosing a furnace heating space below said trough and having a vertical wall abutting the edge of said ledge and terminating above said ledge, the edge of said ledge being welded to said vertical wall to seal the edge to said vertical wall, a cover enclosing the top of said trough and overlapping said vertical wall on the exterior thereof, means securing said cover to said vertical wall but leaving an oil drip space between said cover and said wall, and drain means on the exterior of said vertical wall for collecting the oil which drips through the space between said cover and said vertical wall.

2. A device according to claim 1 wherein said trough includes a ledge on each side thereof which extends substantially the entire length of said trough.

3. A device according to claim 1 wherein said drain means includes a receiving plate extending outwardly from the exterior surface of said vertical wall and defining a receiving basin for the oil.

4. A device according to claim 1 wherein said cover is secured to said vertical wall by spaced through bolts.

5. A device according to claim 1 wherein said drain means comprises an angle member having a substantially horizontal flat receiving plate for the drip oil and a vertical leg secured to said vertical plate.

6. A device according to claim 5 including valve drain tube connected into said horizontal plate portion of said drain means.

7. A device according to claim 1 wherein said cover includes at least one chimney and obliquely extending side walls terminating in substantially vertical portions overlapping said exterior surface of said vertical wall.

* * * * *